S. S. HARPER.
BEARING.
APPLICATION FILED FEB. 23, 1909.
994,920.
Patented June 13, 1911.
2 SHEETS—SHEET 2.
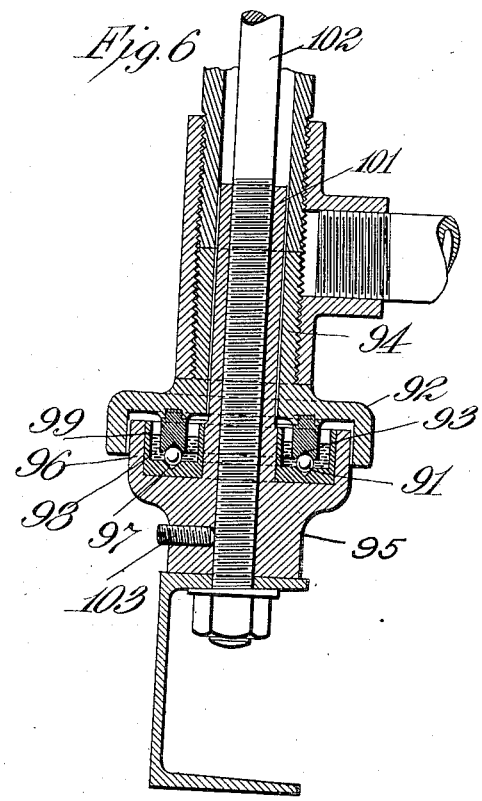
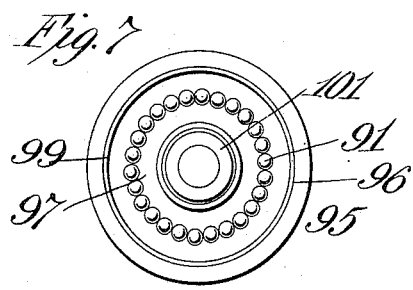
Witnesses:
Jas. F. Coleman
John S. [illegible]
Inventor
Samuel Stewart Harper
By Dyer & Dyer
his Attorneys.

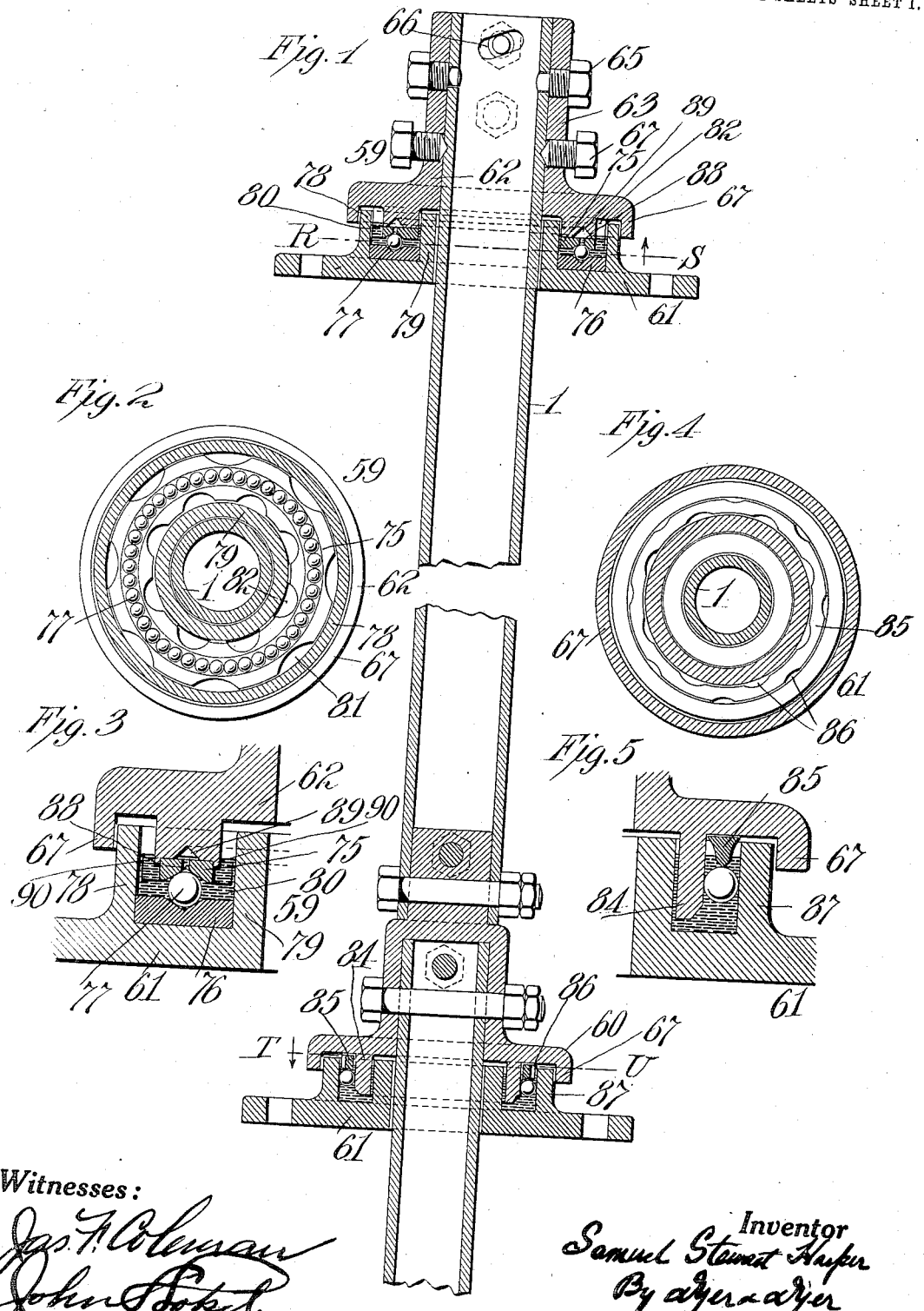

UNITED STATES PATENT OFFICE.

SAMUEL STEWART HARPER, OF PHILADELPHIA, PENNSYLVANIA.

BEARING.

994,920.

Specification of Letters Patent. Patented June 13, 1911.

Application filed February 23, 1909. Serial No. 479,342.

*To all whom it may concern:*

Be it known that I, SAMUEL STEWART HARPER, a citizen of the United States, residing at Philadelphia, county of Philadelphia, and State of Pennsylvania, have invented a certain new and useful Bearing, of which the following is a specification.

The object I have in view is the production of a bearing, in which the friction and wear will be reduced, which will run without requiring attention to lubrication, which will be protected from the weather and entrance of grit, and in which portions abraded by wear or broken in use will be automatically disposed of. These and further objects will appear from the following specification and accompanying drawings.

In the drawings: Figure 1 is a section view of a vertical shaft equipped with supporting and steady bearings of the ball type. Fig. 2 is a section on the line R—S of Fig. 1, looking in the direction of the arrow. Fig. 3 is a detail section view of a modified form of supporting bearing. Fig. 4 is a section on the line T—U of Fig. 1, looking in the direction of the arrow. Fig. 5 is a detail section view of a modified form of steady bearing. Fig. 6 is a vertical section of a modified form of bearing; and Fig. 7 is a plan view of the lower ball race shown in Fig. 6.

In all of the views like parts are designated by the same reference characters.

I show in Fig. 1 the application of my invention to a supporting ball bearing and a steady ball bearing in connection with a vertical shaft 1. Generally speaking, and as will be hereinafter set forth, each of these bearings comprises bearing elements between which are arranged rolling devices which are submerged in a bath of mercury. The supporting bearing 59 is formed of a lower member 61 and an upper member 62. Upon the upper member 62 is carried a continuous annular raceway ring 75. Upon the lower member 61 is carried a continuous annular raceway ring 76 and between the two races is an annular row of balls 77. The lower member 61 has an annular flange 78 and a sleeve 79. The space between the sleeve and flange constitutes an annular chamber. Within this chamber is a quantity of mercury, indicated at 80, sufficient to completely cover the balls and immerse both ball races. This mercury acts as a lubricant and at the same time protects the races and the balls, and prevents oxidation of the balls and races, which may therefore be made of steel. This mercury has a number of advantages not present in any other lubricant. Owing to its great specific gravity,—dust, sand grit or other foreign substances, which may find their way into the annular chamber, will float upon the surface of the liquid and will not penetrate below it; also any portions of the races or balls, which may wear away in the form of flakes, powder or dust, will be carried upward to the surface of the mercury and, should any of the balls become broken, the parts thereof will escape (in a manner which I will describe) and rise to the surface of the liquid and will float thereon. For the purpose of permitting the escape of the broken portions of the balls, I provide a series of slots 88, in the upper ball race. These slots are narrow and are not sufficiently wide to encroach upon the wearing surface of the race. They are sufficiently wide, however, to permit the escape upward of portions of the balls if they should become broken. Above these slots 88, I arrange an annular groove 89, which may be formed in the upper member 62, which holds the upper ball race, and this annular groove serves as a chamber, in which the worn or broken particles will lie, when the latter rise upward through the slots 88, and float upon the surface of the mercury. For the further purpose of permitting the upward escape of portions of the races and balls as they wear, I provide the upper race 75 with a series of inner and outer notches 81, 82. These notches form open spaces or free portions in the mercury bath in which the worn portions of the bearing may collect either in or upon the surface of the mercury. It is to be understood that either or any of the slots 88, or notches 81 or 82 may be omitted, or combined in a different manner than that illustrated. For example, the slots alone may be used, or one or both of the notches may be employed without the slots.

In the modification illustrated in Fig. 3, that portion of the upper bearing member 62, with which the raceway ring 75 is connected, is narrower than the annular chamber which lies between the flange 78 and the sleeve 79, leaving an annular gap on both sides of the portion.

My invention, as applied to a steady bearing, is illustrated at the bottom of Fig. 1. The ball race is here formed between the annular flange 87 on the lower bearing member 61, and a flange 84, carried by the upper bearing member. The annular chamber is filled, as before, with a bath of mercury, the row of balls floating within such bath. A gasket or washer 85 keeps the balls in immersed position, and causes them to run truly within the race. This washer may be provided with notches 86, as shown in Fig. 4, to permit particles or pieces of the balls and races to float to the surface of the mercury. Fig. 5 represents a modification in which the lower sides of the washer 85 is brought to an edge. The cross section of the washer is more or less triangular, thereby giving sufficient space on each side for the accumulation of the worn particles floating on the surface of the mercury.

For the purpose of excluding foreign matter and protecting the inside of the bearing from the weather, I provide the upper bearing members each with an encircling skirt 67, such skirt extending over and down beyond the outer upper edge of the annular flanges 78 and 87, respectively.

I illustrate in connection with my invention a means for adjusting the position of the shaft 1 in relation to the supporting bearing, which is particularly useful when the invention is applied to wind mills. This supporting means comprises bolts 65 having reduced unthreaded extremities which pass through openings in a sleeve 63, carried by the member 62, and engage at their inner extremities with inclined slots 66 formed in the shaft 1. By turning or twisting the shaft 1 in relation to the member 62, the former may be raised or lowered. The shaft is secured in position by means of set screws 67 which pass through the sleeve 63 and engage with the shaft 1. These set screws also serve to some extent to support the weight of the shaft 1.

In Fig. 3 I show means for retaining the upper raceway ring 75 in position under the upper member 62. This means comprises annular lips or ears 90 which extend around (with or without interruption) the ring, and hold it properly centered upon the row of balls.

It is to be understood that the parts of the bearing which are in contact with the mercury must be made of, or properly protected by, a material which will be neutral to mercury. I propose to make the bearing of iron or steel, but if bronze or other metal is used, with which the mercury would combine, I may make the races and their immediate supports of iron, or cover the bronze with a protecting enamel or other covering.

Figs. 6 and 7 illustrate a modification of the invention applied to a situation, in which a steady bearing is combined with a supporting bearing. The supporting bearing comprises the annular row of balls 91, an upper member 92, having an upper annular ball race 93, and a hollow stem or sleeve 94. With this is combined a lower member 95, provided with an annular cup shape cavity 96, within which is the lower ball race 97. The mercury 98 partly fills the annular chamber 96 and covers the balls 91. Within the annular chamber, as illustrated in Fig. 6, and combined with the lower race 97, is an annular pocket 99. This annular pocket is formed of concentric walls carried by the ball race and constitutes a vessel in which the mercury is contained. The lower member 95 is provided with a stem or projection 101, which lies within the sleeve 94 of the other member. The members 101 and 94 constitute a steady bearing, and prevent lateral displacement of the parts. For the purpose of preventing freezing or sticking of the parts by rusting, or otherwise, I prefer to make the two members 94 and 101 of non-rustable metals. In the structure illustrated in Fig. 6, the upper member 92 is best made of bronze or other non-rustable metal with the steel ball race 93 attached thereto, while the lower member 95 and stem 101 are made of bronze or brass. By making the engaging surfaces 101 and 94 of dissimilar metals there will be no sticking or freezing when the parts come in contact. The annular pocket 99, being made of steel,—as is also the race 91—they will not be chemically acted upon by the mercury, and they will also serve to keep the mercury out of contact with the bronze or brass member 95. In the structure illustrated, the member 95 is attached to a stay or rod 102, by being screwed thereon, and prevented from turning by a set screw 103. The structure illustrated is adapted to form one of the bearings of a windmill vane, such as is illustrated in my copending application, filed February 23rd, 1909, Serial Number 479,373.

I have shown my invention as embodied in a bearing having a row of balls between the bearing elements. My invention is not limited, however, to the use of balls, since it may be employed in connection with any type of bearing having intermediate rotating members. In the following claims, therefore, I use the expression "rolling devices" to include balls, rollers, wheels, or any other similar elements.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what

I claim as new and desire to secure by Letters Patent, is:—

1. A bearing having bearing elements, rolling devices between said elements, and a bath of mercury submerging said rolling devices, said bath having a free portion in which the broken portions of said bearing can collect.

2. A bearing having bearing elements, rolling devices between said elements, and a bath of mercury submerging said rolling devices and the active faces of said elements, said bath having a free portion higher than said rolling devices in which broken portions of said bearing can collect.

3. A bearing having bearing elements with opposing races therein, rolling devices between said races, a bath of mercury for said rolling devices and races, and means independent of said races for maintaining said rolling devices submerged.

4. A bearing having bearing elements with opposing races therein, rolling devices between said races, a bath of mercury, and means for maintaining said rolling devices submerged, said bath having a free portion in which broken portions of the bearing can collect.

5. A ball bearing, having elements with opposing races, rolling devices between the races, a bath of mercury submerging the rolling devices, and an annular member engaging with the rolling devices, said annular member being in addition to the races, and having openings to permit the escape of worn or broken parts.

6. A ball bearing having elements with opposing races, rolling devices between the races, a bath of mercury submerging the rolling devices, and an annular member engaging with the rolling devices, said annular member being in addition to the races, and having cut-away portions to permit the escape of worn or broken parts.

This specification signed and witnessed this 18th day of February, 1909.

SAMUEL STEWART HARPER.

Witnesses:
  LEONARD H. DYER,
  JOHN L. LOTSCH.